Figure 1:
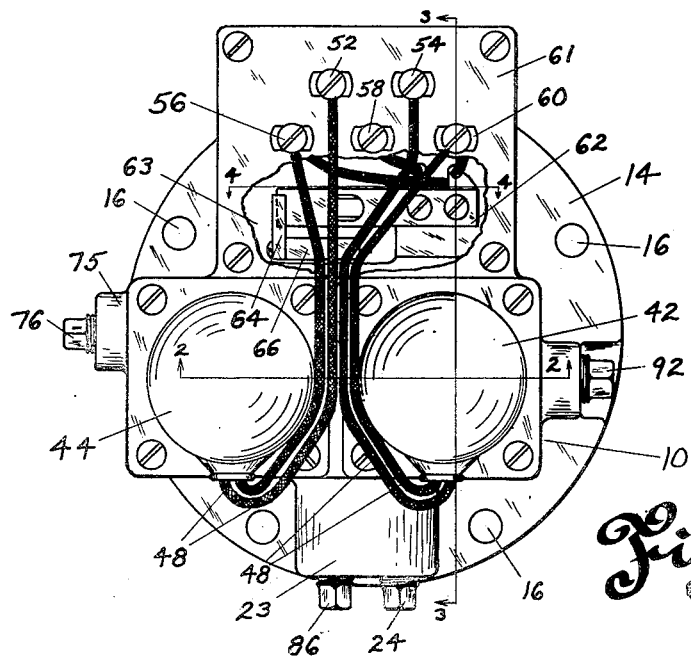

Dec. 9, 1952 — L. M. PERSONS — 2,620,828
CONTROL DEVICE

Filed Dec. 31, 1947 — 2 SHEETS—SHEET 1

INVENTOR
LAWRENCE M. PERSONS
BY
Rey Eilers
ATTORNEY

Dec. 9, 1952  L. M. PERSONS  2,620,828
CONTROL DEVICE
Filed Dec. 31, 1947  2 SHEETS—SHEET 2

INVENTOR
LAWRENCE M. PERSONS
BY
Rey Eilers
ATTORNEY

Patented Dec. 9, 1952

2,620,828

UNITED STATES PATENT OFFICE 2,620,828

CONTROL DEVICE

Lawrence M. Persons, Chesterfield, Mo., assignor to McQuay-Norris Manufacturing Company, St. Louis, Mo., a corporation of Delaware Application December 31, 1947, Serial No. 795,038

4 Claims. (Cl. 137—701)

This invention relates to improvements in control devices. More particularly, this invention relates to improvements in control devices that regulate and direct the movement of fluids under pressure.

It is therefore an object of the present invention to provide an improved control device which regulates and directs the movement of fluids under pressure.

It is oftentimes desirable to regulate and direct the movement of fluids which are under pressure; and in such instances it is oftentimes desirable to regulate and direct that movement in response to temperature conditions. In the operation of refrigerated vehicles, for example, it is desirable to regulate and direct the movement of fluid in hydraulic clutches and thus selectively connect the refrigeration equipment of the vehicles to the wheels or axles of those vehicles; and it is desirable to have thermally responsive elements regulate and direct the movement of the fluid in the hydraulic clutches. The thermally responsive elements can achieve regulation and direction of the fluid in the hydraulic clutches by selectively energizing a control device which can direct hydraulic fluid from the pumps, or other sources of fluid under pressure, to the high pressure inlet of the hydraulic clutches in the one case or to the sumps of those clutches in the other case. Energization of the control device enables the hydraulic clutches to cause the wheels or axles of the refrigerated vehicles to drive the refrigeration equipment whenever the temperatures within the refrigerated spaces of the vehicles rise above predetermined levels, and also enables those clutches to permit the wheels or axles of the refrigerated vehicles to run free of the refrigeration equipment whenever the temperatures within the refrigerated spaces of the vehicles fall below the predetermined levels. An arrangement of this type provides the required power for the operation of the refrigeration equipment and yet it does not impose a drag on the refrigerated vehicle when the temperatures within the refrigerated spaces of the vehicles are sufficiently low.

In such an arrangement it is desirable that the thermally responsive device cause prompt and positive regulation and direction of the fluid under pressure; and the control device of the present invention provides such prompt regulation and direction by using a valve that is positively held in position by a lever and is capable of prompt movement from "open" to "closed" position. The lever is movable to one position to free the valve for movement and is movable to a second position to positively lock the valve against movement; and that lever is moved promptly and selectively by a pair of solenoids. With this arrangement, a decrease in the temperature within the refrigerated space of a refrigerated vehicle will cause the thermally responsive device to energize one of the solenoids and move the lever to a position where it can free the valve for movement, thus permitting the hydraulic fluid to pass to the sump of the hydraulic clutch. Conversely, an increase in the temperature of that refrigerated space will cause the thermally responsive device to energize the other solenoid and move the lever to a position where it positively locks the valve in "closed" position, thus forcing the hydraulic fluid to pass to the high pressure inlet of the hydraulic clutch. In this way, temperature conditions within the refrigerated space of a refrigerated vehicle can provide selective and prompt actuation of the hydraulic clutches, and thus cause concomitant actuation of the refrigeration equipment of the refrigerated vehicle. It is therefore an object of the present invention to provide a control device with a pair of solenoids that selectively and promptly move a lever to free a valve for movement or to positively lock that valve against movement.

In the operation of refrigerated vehicles, it is desirable to minimize the drain on the electric batteries carried by those vehicles. Where this is done, fewer or smaller electric batteries can be carried by those vehicles or the length of time between charging periods can be increased. The control device of the present invention minimizes the drain on the electric batteries carried by the refrigerated vehicles, and still uses electric power to control the position of the lever and valve, by providing momentary energization of the solenoids to move the valve-actuating lever and by providing a spring that holds the valve-actuating lever against accidental movement. It is therefore an object of the present invention to provide a control device wherein the solenoids are energized only momentarily to move the valve-actuating lever and wherein a spring holds the valve-actuating lever against accidental movement.

The momentary energization of the solenoids is attained by having the valve-actuating levers operate switches in the circuits of those solenoids. Those switches can be so related to the solenoids that when a solenoid causes the valve-actuating lever to move, it causes the switch or switches to open its circuit and simultaneously ready the other solenoid for energization. This provides the desired movement of the valve-actuating lever with a minimum expenditure of electric power. It is therefore an object of the present invention to provide a control device wherein a switch or switches, operated by the valve-actuating lever of the control device, opens the circuit of the recently energized solenoid and readies the other solenoid for energization.

In the operation of a temperature-responsive control system it is necessary to interrelate the action of the thermally responsive element with the action of the control device so the control device will provide refrigeration effect only when the thermally responsive element calls for it. In the absence of this interrelation, the temperature within the refrigerated space of the refrigerated vehicle could become excessively high or excessively low. The present invention provides such an interrelation by having the thermally responsive element operate one switch, by having the lever operate another switch, and by having the solenoids energized only when the two switches of the control device are in a predetermined relation. It is therefore an object of the present invention to provide a control device wherein the solenoids are energized only when the two switches of the control device are in a predetermined position relation.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

Figure 2:
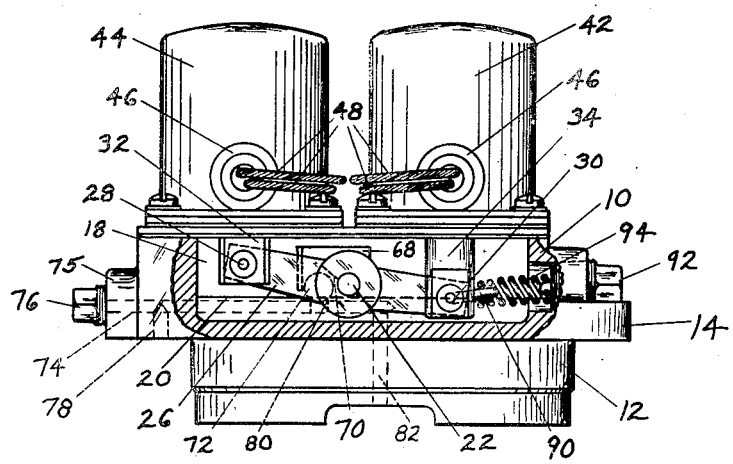
Figure 3:
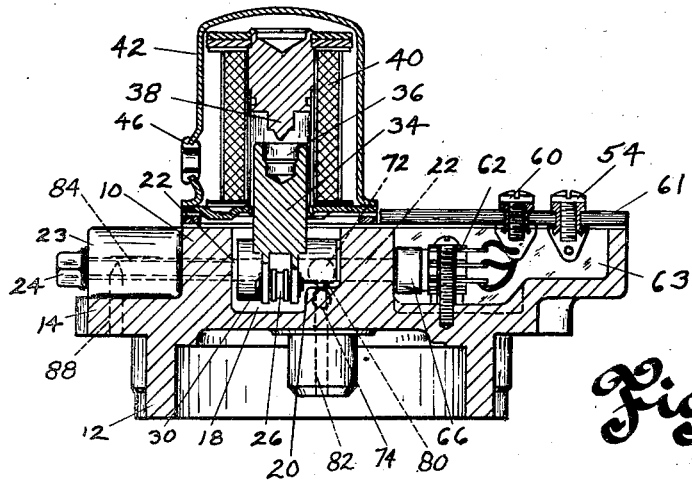
Figure 4:
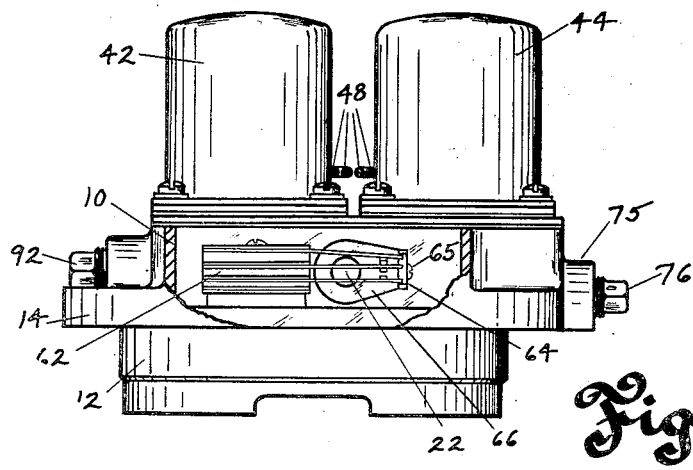
Figure 5:
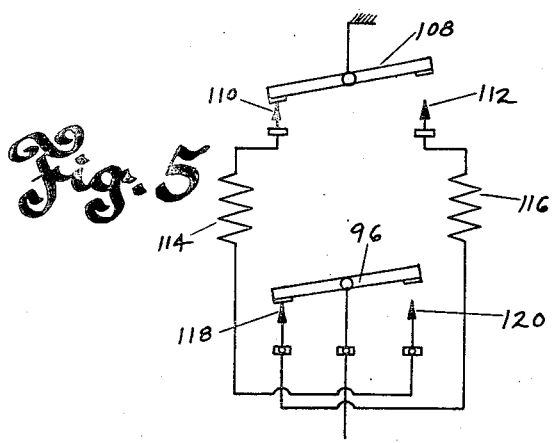
Figure 6:
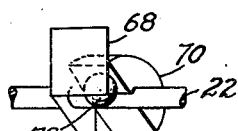

In the drawing Fig. 1 is a plan view of a control device that is made in accordance with the principles and teachings of the present invention, Fig. 2 is a partially sectioned view of the control device of Fig. 1, and it is taken along the plane indicated by the line 2—2 in Fig. 1, Fig. 3 is a cross sectional view of the control device of Fig. 1, and it is taken along the plane indicated by the line 3—3 in Fig. 1, Fig. 4 is a partially sectioned view of the rear of the control device of Fig. 1, and it is taken along the plane indicated by the line 4—4 in Fig. 1, Fig. 5 is a schematic diagram of the electrical circuit of the control device of Figs. 1–4, and Fig. 6 is a perspective view of a valve element, guide, cam and shaft used in said control device.

Referring to the drawing in detail, the numeral 10 denotes a cast or molded support of generally circular form. The support 10 is dimensioned to extend into and form a part of a housing which receives hydraulic fluid under pressure, as for example the housing for a hydraulic clutch. The support 10 is preferably made of an insulating material which is sufficiently strong to withstand the hydraulic pressures exerted within the housing; one such insulating material being a thermo-setting resin like Bakelite or Micarta. The support 10 has a downwardly depending cylindrical projection 12 which extends into and fits within an opening in one wall of the housing, not shown, for the hydraulic clutch; and the cylindrical projection 12 has a circular flange 14 projecting radially therefrom. The lower surface of flange 14 is dimensioned to bear against that portion of the housing for the hydraulic clutch which is adjacent the opening that receives the cylindrical projection 12; and that portion of the housing is machined to have a smooth surface. Holes 16 are provided in the flange 14, and those holes receive screws or bolts that seat in the portion of the clutch housing that surrounds the opening in the clutch housing. The screws or bolts, not shown, maintain the support 10 in assembled relation with the housing for the hydraulic clutch.

The support 10 has an elongated cavity 18 formed in the interior thereof, and that cavity extends transversely of the support 10. A ledge 20 is formed on one of the side walls of the cavity 18, and that ledge also extends transversely of the support 10. An opening is provided in each of the walls which form the sides of the cavity 18, and those openings are located above the level of the top of the ledge 20. The two openings are in register with each other, and they receive the opposite ends of a shaft 22 which is positioned within the cavity 18. The shaft 22 spans the cavity 18, and it is pivotally mounted in those openings. The two openings may be formed in various ways, but they are conveniently formed by placing a drill against the stud 23 on support 10, and causing that drill to pass to and through the cavity 18. The outer end of the opening in stud 23 is closed and tightly sealed by the threaded plug 24 that seats in threads formed in the outer end of that opening. This provides a simple and economical way of forming a support for the shaft 22, and yet it maintains the liquid-tight integrity of the support 10.

The shaft 22 supports a lever 26 which is secured to the shaft 22 in such a way that rotation of the shaft causes oscillation of the lever, and so oscillation of the lever 26 causes rotation of the shaft 22. The outer ends of the lever 26 carry transversely extending pins 28 and 30; the pin 28 being located at the left hand end of the lever 26, and the pin 30 being located at the right hand end of the lever 26. The pins 28 and 30 serve to secure plungers 32 and 34 to the lever 26 while permitting relative rotation between those plungers and the lever 26. Each of the plungers 32 and 34 has a recess 36 in the top thereof; those recesses being as shown in Fig. 3. The recesses 36 are intended to receive the cores 38 of solenoids which are disposed adjacent to the upper ends of plungers 32 and 34 and have windings 40. With this arrangement, the solenoid cores 38 can intimately receive the upper ends of the plungers 32 and 34; and the projections on the lower ends of the cores 38 will reduce the reluctance of the paths for the magnetic lines of force from the windings 40 of the solenoids. The plungers 32 and 34 are made of magnetic material, and they will promptly respond to selective energization of the solenoids.

The solenoids are provided with covers 42 and 44; those covers protecting the windings 40 of the solenoids against dirt, water, and other materials and also protecting the windings 40 from contact or abuse. Grommets 46, of rubber or a like material, are provided in the housings 42 and 44; and those grommets receive the electrical leads 48 for the windings 40 of the solenoids. When the leads 48 are positioned within the grommets 46 they virtually close the central openings of those grommets, thus preventing accidental inlet of dust, dirt and the like into the housings 42 and 44.

Each of the windings 40 of the solenoids has two leads 48 and those leads extend to terminals 52, 54, 56 and 60 which are located on a cover plate 61. This plate overlies a cavity 63 in the support 10, and that cavity is largely separate and distinct from the cavity 18. The cover plate 61 also supports a terminal 58; the terminals 52 through 60 being secured to the cover plate 61 by riveting their lower ends. Each of the terminals 52 through 60 has a screw which can be rotated relative to the rest of the terminal to facilitate the attachment of electrical leads to the terminals.

One of the electrical leads 48 from the solenoid positioned within housing 42 extends to the terminal 54 while the other lead from the solenoid in that housing extends to the terminal 60. One of the electrical leads from the solenoid in housing 44 extends to the terminal 52 while the other lead from that solenoid extends to the terminal 56. The terminals 56, 58 and 60 are individually connected to the three contacts of a switch 62 by conductors, as shown particularly in Figs. 1 and 3; and the switch and conductors are positioned in cavity 63 below cover plate 61. The terminal 56 is connected to the bottom contact of the switch 62, the terminal 58 is connected to the center contact of the switch 62, and the terminal 60 is connected to the top contact of the switch 62. These three contacts, which are shown particularly in Fig. 4, are in the form of leaves; and they extend outwardly from layers of insulation which form the left hand end of switch 62. In normal position, the three leaves are parallel to, and do not engage, each other. However, the top leaf and the bottom leaf are bendable into contact with the center leaf to close a circuit through that leaf. The bending of the top and bottom leaves is accomplished by selective movement of an insulated fork 64. This fork is secured to the end face of a cam 66 by a screw 65; and the cam 66, which is mounted on the shaft 22, will move with that shaft to cause movement of the fork 64. With this construction, the shaft 22 will cause closing of the top and center contacts of the switch 62 in one position, and will cause closing of the center and bottom contacts in a second position, thus selectively closing a circuit between terminals 54 and 58 in one position and closing a circuit between terminals 52 and 58 in a second position. The fork 64 is so dimensioned that one or the other of the top and bottom contacts is always in engagement with the center contact of switch 62.

In the cavity 18, provided within the support 10, a guide 68 is positioned; and that guide closely confines a valve 72 for vertical movement. Downward movement of valve 72 brings it into engagement with the valve seat 80, while upward movement of valve 72 moves it away from that seat, thus permitting fluid to pass through the seat 80. The valve 72 is acted upon by a valve-actuating cam 70 which is carried by the shaft 22; and the actuating surface of that cam, which is shown on dotted lines in Fig. 2, selectively holds the valve 72 against valve seat 80 or permits the valve 72 to move away from the seat 80. The guide 68 permits the valve 72 to move away from the valve seat 80, and yet it confines that valve in position above the valve seat 80. This enables the valve-actuating cam 70 to force the valve 72 into engagement with the valve seat 80 with certainty and without delay. The valve 72 is in the form of a ball, but obviously any other suitable form of valve could be used.

The valve seat 80 is positioned above, and is contiguous with, a duct 74 that is formed in the ledge 20 at one side of the cavity 18. This duct extends to the outer periphery of the support 10, and it is closed by the threaded plug 76. In forming the duct 74, an opening may be drilled through the stud 75 on support 10, and then the outer end of that opening may be threaded to receive the plug 76. This provides a simple and inexpensive way of forming the duct 74, and yet it preserves the liquid-tight integrity of the support 10. A vertically disposed inlet 78 is formed in the flange 14 of the support 10, and that inlet is contiguous with and communicates with the duct 74. As a result, hydraulic fluid introduced into the inlet 78 will pass into the duct 74 and to the valve seat 80. If the valve 72 is held onto its seat by the valve-actuating cam 70, the hydraulic fluid will be unable to pass upwardly into the cavity 18; instead, that fluid will pass to the inner end of the duct 74 where it will be directed downwardly through the outlet 82 formed in the support 10. Where, however, the valve 72 is not held down onto the valve seat 80 by the valve-actuating cam 70, the hydraulic fluid can force the valve 72 upwardly from the seat 80 and pass into the cavity 18. The fluid that enters cavity 18 can pass to the duct 84, which is formed in the support 10, and it can then pass through that duct to the outlet 88. This outlet is directed downwardly and terminates at the lower surface of flange 14. The duct 84 may be formed in the support 10 by drilling a hole in the stud 23 of support 10, and then enlarging the end of that hole to receive the threaded plug 86. This forms an economical way of making the duct 84 and yet preserving the fluid-tight integrity of the support 10.

With this arrangement, the valve 72 can selectively direct hydraulic fluid to the outlet 82 or can permit that fluid to pass through cavity 18 to outlet 88. Outlet 82 extends into the high pressure chamber of the hydraulic clutch housing, while the outlet 88 is connected to the sump of that housing. The pressure, exerted on the hydraulic fluid, will be great enough to actuate the hydraulic clutch; thus enabling that clutch to cause the wheels or axle of the refrigerated vehicle to drive the refrigeration equipment used in providing the required refrigeration effect. However, when the valve 72 is not positively held on the valve seat 80, by the valve-actuating cam 70, the hydraulic fluid will lift the valve 72 and pass through cavity 18 and duct 84 to outlet 88. The walls of the housing, not shown, for the hydraulic clutch have two ducts; one in register with the inlet 78, and the other in register with the outlet 88. The duct in register with the inlet 78 is connected to the pump for the hydraulic fluid, and the duct in register with the outlet 88 is in communication with the sump of the hydraulic clutch housing. The fluid passing through outlet 88 will be collected in the sump for re-use, and it cannot create a sufficient pressure at outlet 82 to actuate the hydraulic clutch. Thus, when the valve 72 is not held onto the valve seat 80 by the cam 70, the hydraulic clutch is not actuated and the wheels and axle of the refrigerated vehicle can run free of the load which the refrigeration equipment represents. Thus, by controlling movement of the valve-actuating cam 70, the control device of the present invention selectively controls the energization or deenergization of the hydraulic clutch.

The valve-actuating cam 70 is moved whenever the shaft 22 moves; and that shaft is selectively oscillated by movement of the lever 26. Selective actuation of the solenoids within housings 42 and 44 will rotate the lever 26 in a clockwise or counterclockwise direction, thus rotating the shaft 22 and enabling the valve-actuating cam 70 to force the valve 72 down into contact with the valve seat 80 or to free that valve for limited movement. Once the lever 26 has moved to either end of its limit of travel, it will be held in that position by the action of pivoted lug 90, pin 39, plug 92, and helical spring 94. The spring 94 extends between and bears against the lug 90 and the plug 92; and that spring will act to hold the lever 26 in whichever position it assumes, because the plug 92 is intermediate the limits of travel of the lever 26. Moreover, the spring 94 is a compression spring, and when the lever is in the position shown in Fig. 2 that spring will press downwardly and hold lever 26 in position against accidental movement. Similarly when the lever 26 is in its other position, spring 94 will press upwardly against the end of the lever 26 and hold it in that other position. Not only will the spring 94 hold the lever in whatever position it assumes, but that spring will provide a force that resists the tendency of the hydraulic fluid to cause rotation of lever 26. For example, when the lever 26 is in its valve-closing position, the pressure on the bottom side of the ball valve 72 will tend to force that valve upwardly, thus tending to cause clockwise rotation of the lever 26. That tendency will be resisted successfully and completely by the pressure of the spring 94.

As the shaft 22 rotates under the action of the solenoids, it will cause rotation of the switch-actuating cam 66. The insulated fork 64 on the end of the cam 66 selectively closes circuits between the center contact and the upper and lower contacts; thus causing opening or closing of the circuits between the contacts 52, 54 and 58, and thereby energizing and deenergizing the solenoids within the housings 42 and 44.

The circuit diagram of the control device provided by the present invention is shown schematically in Fig. 5; and in that figure the numeral 108 denotes a thermally responsive device which selectively connects fixed contacts 110 and 112 to ground as the temperature increases and decreases. The fixed contact 110 is directly connected to one end of the winding of a solenoid 114, which corresponds to the solenoid winding in housing 42; and the other end of solenoid winding 114 is connected to the contact 120, which corresponds to the upper contact blade of switch 62. When the contact 96, which corresponds to the center contact of switch 62, is made to engage contact 120, as by the bending of the upper blade of switch 62 into engagement with the center contact blade of that switch, the solenoid winding 114 is connected to a source of current. This source will be the battery of the refrigerated vehicle. When the thermally responsive element 108 is in engagement with the fixed contact 110, and when the switch element 96 is in engagement with the contact 120, the solenoid 114 will be energized by current passing from the battery to ground. However, the action of the solenoid 114 is to cause counter-clockwise rotation of the element 96; and, as a result, the solenoid 114 will rotate that element into the position shown in Fig. 5, thus breaking its own circuit at contact 120. This results in deenergization of the solenoid 114 after it has caused the lever 26 to move; consequently the solenoid 114 is normally deenergized, and it does not constitute a drain on the battery of the refrigerated vehicle. A similar circuit is shown for the solenoid winding 116, which corresponds to the solenoid winding in housing 44. That circuit extends from the thermally responsive element 108 through fixed contact 112, through the solenoid winding 116, through contact 118, and then through switch element 96 to the battery. The contact 118 corresponds to the lower contact blade of switch 62, and it is made to contact the switch element 96, as by bending that lower contact upwardly against the center contact. Here again, when the solenoid 116 is energized it tends to rotate the element 96 to a position which deenergizes the solenoid 116 by interrupting its circuit at contact 118. When the thermally responsive element 108 is in engagement with contact 112, and when the switch element 96 is in engagement with the contact 118, a circuit is completed through the solenoid 116 that causes energization of that solenoid. However, energization of the solenoid 116 causes clockwise rotation of the switch element 66, thus opening the circuit of the solenoid 116 at contact 118. As soon as the solenoid 116 has been energized it will deenergize itself at contact 118. Thus the solenoids 114 and 116 can be selectively energized but will promptly deenergize themselves so they do not constitute a drain on the battery carried by the refrigerated vehicle.

It will be noted that the thermally responsive element 108 must be in phase with the contacts of the switch 62 before the solenoids 114 and 116 can be energized. This prevents improper energization of the refrigeration equipment of the refrigerated vehicle. For example, if the thermally responsive element 108 calls for increased refrigeration effect and is momentarily dislodged from engagement with contact 112 and then permitted to re-engage that contact, no shift can occur in the position of the contact blades of switch 62 or of valve 72. Instead, the control device will continue to provide the required refrigeration effect until the thermally responsive element leaves fixed contact 112 and moves to fixed contact 110. Similarly, if the thermally responsive element 108 was calling for refrigeration effect and was momentarily caused to strike contact 110 and then permitted to re-engage contact 112, the lever 26, valve 72, and cam 66 might move to deenergizing position but they would positively return to energization position. No matter how the thermally responsive element 108 is caused to move, its movement cannot cause improper actuation of the switch 62, since the element 108 and switch 62 are electrically interlocked. Similarly, if the switch 62 were jostled from its intended position to its other position, that movement would merely energize the solenoid which originally moved the switch to its intended position; and that solenoid would immediately restore lever 26 to its intended position. This electrical interlocking of the thermally responsive element 108 and the switch 62 avoids a situation where accidental jostling of the thermally responsive element or of the rotatable lever would cause undue or insufficient cooling of the refrigerated space in the refrigerated vehicle.

With the control device provided by the present invention, it is possible to attain prompt and selective actuation of the hydraulic clutch used to connect the wheels or axle of the refrigerated vehicle with the refrigeration equipment carried by that vehicle. By doing so, the control device attains actuation of the refrigeration equipment when required and yet disconnects that refrigeration equipment from the wheels or axle of the refrigerated vehicle when it is not required. Thus the refrigeration equipment is not a load on the axle or wheels except when it must be. Moreover, the device positively maintains the proper phase relation between the thermally responsive element and the rotatable shaft, thus avoiding improper heating or cooling of the refrigerated space.

Whereas a preferred embodiment of the present invention has been shown and described in the drawing and accompanying description it should be obvious to those skilled in the art that various changes may be made in the form of the invention without affecting the scope thereof.

What I claim is:

1. A control device that comprises a support, a valve seat in said support, a valve element, a valve-actuating cam, a rotatable shaft that carries said cam, bearing surfaces that hold said shaft for rotation relative to said support and hold said valve-actuating cam in registry with said valve element, said valve-actuating cam having a radius effective to enable said cam to engage and move said valve element, a lever secured to and rotatable with said shaft to move said cam into engagement with said valve element, a solenoid plunger connected to said lever to actuate same, and a spring, said spring being disposed adjacent one end of said lever and having one end thereof secured to said one end of said lever and having the other end thereof fixed, said fixed end of said spring and said shaft defining a plane, said one end of said lever being selectively movable from a position at one side of said plane to a position at the other side of said plane, said spring being distorted whenever said lever moves from either of said positions toward said plane, whereby said spring biases said lever toward said two positions, said valve-actuating cam providing an inelastic connection between said lever and said valve element.

2. A control device that comprises a support, a valve seat in said support, a valve element, a valve-actuating cam, a rotatable shaft that carries said cam, bearing surfaces that hold said shaft for rotation relative to said support and hold said valve-actuating cam in registry with said valve element, said valve-actuating cam having a radius effective to enable said cam to engage and move said valve element, a lever secured to and rotatable with said shaft to move said cam into engagement with said valve element, a plurality of solenoid plungers secured to said lever to move said lever to one or the other of two positions, and a spring, said spring being fixed at one end and being connected to said lever at the other end, said fixed end of said spring and said shaft defining a plane, said one end of said lever being selectively movable from a position at one side of said plane to a position at the other side of said plane, said spring being distorted whenever said lever moves from either of said positions toward said plane, whereby said spring biases said lever toward said two positions, the points of securement of said lever and said plungers being spaced from said bearing surfaces distances which are greater than the effective radius of said valve-actuating cam whereby the spring pressure applied to said lever is multiplied and applied to said valve-actuating cam.

3. A control device that comprises a support, a cavity in said support, a valve seat in said cavity, a valve element selectively engageable with said valve seat, a guide that holds said valve element adjacent said valve seat, a shaft in said cavity, bearing surfaces that hold said shaft for rotation relative to said support, a valve-actuating cam that is mounted on and is rotatable with said shaft and has an effective radius which enables it to rotate and move said valve element against said valve seat, said valve element being capable of being raised off said valve seat by fluid entering said cavity, a lever fixedly secured to and rotatable with said shaft, a solenoid that has the plunger thereof connected to said lever and that is energizable to move said lever, said shaft, and said valve-actuating cam to a predetermined position, said valve-actuating cam being adjacent said valve seat in said predetermined position to hold said valve element in engagement with said valve seat and thus prevent entry of fluid into said cavity, said valve-actuating cam being rotatable to a second position spaced from said valve seat to permit said valve element to rise off of said valve seat, a spring biasing said lever to valve closing position, a switch that is a part of the energizing circuit of said solenoid and is movable with said shaft and said valve-actuating cam, said switch and said lever being related so said switch opens the energizing circuit of said solenoid whenever said lever is in said predetermined position, whereby said solenoid is energized only momentarily in moving to said predetermined position, and an outlet from said cavity, the connection between said lever and said solenoid plunger being spaced from said shaft a distance greater than the effective radius of said valve-actuating cam, whereby the force of said spring on said lever is multiplied and applied to said valve element.

4. A control device that comprises a support, a valve seat in said support, a valve element that is selectively engageable with said valve seat, a lever, bearing surfaces for said lever that hold said lever for rotation relative to said support, a surface that is movable whenever said lever rotates and is held in registry with said valve element by said bearing surfaces and is adapted to cause movement of said valve element, said lever being rotatable to cause movement of said surface and thereby cause movement of said valve element relative to said valve seat, a pair of solenoids that operatively engage said lever and that are selectively energizable to cause rotation of said lever, one of said solenoids being energizable to move said lever to one position and the other of said solenoids being energizable to move said lever to another position, a switch that is a part of the energizing circuits of said solenoids and is movable with said lever to selectively open and close the circuits of said solenoids, said switch and said lever being related so said switch opens the circuit to said one solenoid and closes the circuit to the other of said solenoids whenever said lever is in said one position and so said switch opens the circuit to the other of said solenoids and closes the circuit to said one solenoid whenever said lever is in said other position, whereby said solenoids are only momentarily energized, and a resilient spring biasing said lever to both of said positions, said lever and said surface being related so said lever acts through said surface in said one position to hold said valve element in engagement with said valve seat and acts through said surface in said other position to permit said valve element to move away from said valve seat.

LAWRENCE M. PERSONS.

REFERENCES CITED

The following references are of record in the file of this patent:

UNITED STATES PATENTS

| Number | Name | Date |
|---|---|---|
| Re. 10,802 | Johnson | Jan. 25, 1887 |
| 1,024,729 | Lawler | Apr. 30, 1912 |
| 1,060,028 | Rorke et al. | Apr. 29, 1913 |
| 1,674,021 | Pace | June 19, 1928 |
| 1,883,766 | Cox et al. | Oct. 18, 1932 |

FOREIGN PATENTS

| Number | Country | Date |
|---|---|---|
| 1,082 | Great Britain | 1901 |
| 697,629 | Germany | 1940 |